United States Patent
Mann et al.

(10) Patent No.: US 7,373,491 B2
(45) Date of Patent: May 13, 2008

(54) PROCESSOR WITH VERSATILE EXTERNAL MEMORY INTERFACE

(75) Inventors: Joseph Francis Mann, Waukesha, WI (US); John Robert Figie, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 616 days.

(21) Appl. No.: 10/083,814

(22) Filed: Feb. 27, 2002

(65) Prior Publication Data

US 2003/0163681 A1 Aug. 28, 2003

(51) Int. Cl.
*G06F 9/24* (2006.01)
(52) U.S. Cl. .............................. 713/1; 713/2
(58) Field of Classification Search .............. 713/1, 713/2; 709/220, 222
See application file for complete search history.

(56) References Cited

U.S. PATENT DOCUMENTS

| | | | | |
|---|---|---|---|---|
| 4,720,812 A | * | 1/1988 | Kao et al. ................... | 713/2 |
| 5,327,393 A | * | 7/1994 | Koyanagi ................. | 365/233 |
| 5,497,492 A | * | 3/1996 | Zbikowski et al. ............ | 713/2 |
| 5,802,550 A | * | 9/1998 | Fullam et al. .............. | 711/102 |
| 5,802,592 A | * | 9/1998 | Chess et al. ................ | 711/164 |
| 6,272,637 B1 | * | 8/2001 | Little et al. ................. | 713/194 |
| 6,407,960 B1 | * | 6/2002 | Egbert et al. .......... | 365/230.04 |
| 6,577,158 B2 | * | 6/2003 | Gupta ......................... | 326/39 |
| 6,671,779 B2 | * | 12/2003 | Devereux .................... | 711/128 |
| 6,748,527 B1 | * | 6/2004 | Utsumi et al. ................. | 713/2 |
| 6,803,785 B1 | * | 10/2004 | May et al. ..................... | 326/39 |

* cited by examiner

*Primary Examiner*—Rehana Perveen
*Assistant Examiner*—Tse Chen
(74) *Attorney, Agent, or Firm*—Keith M. Baxter; Alexander R. Kuszewski

(57) ABSTRACT

A processor architecture suitable for embedded systems and compatible with different kinds of external memory, executes a bootstrap program to determine the characteristics of the external memory before connection with the external memory. For this purpose, system storage structures such as cache, buffers, and registers are enlisted as temporary memory for the execution of the bootstrap program up to configuration of the external memory. External memory setup data may be obtained from a variety of sources including external flash memory or a network.

23 Claims, 2 Drawing Sheets

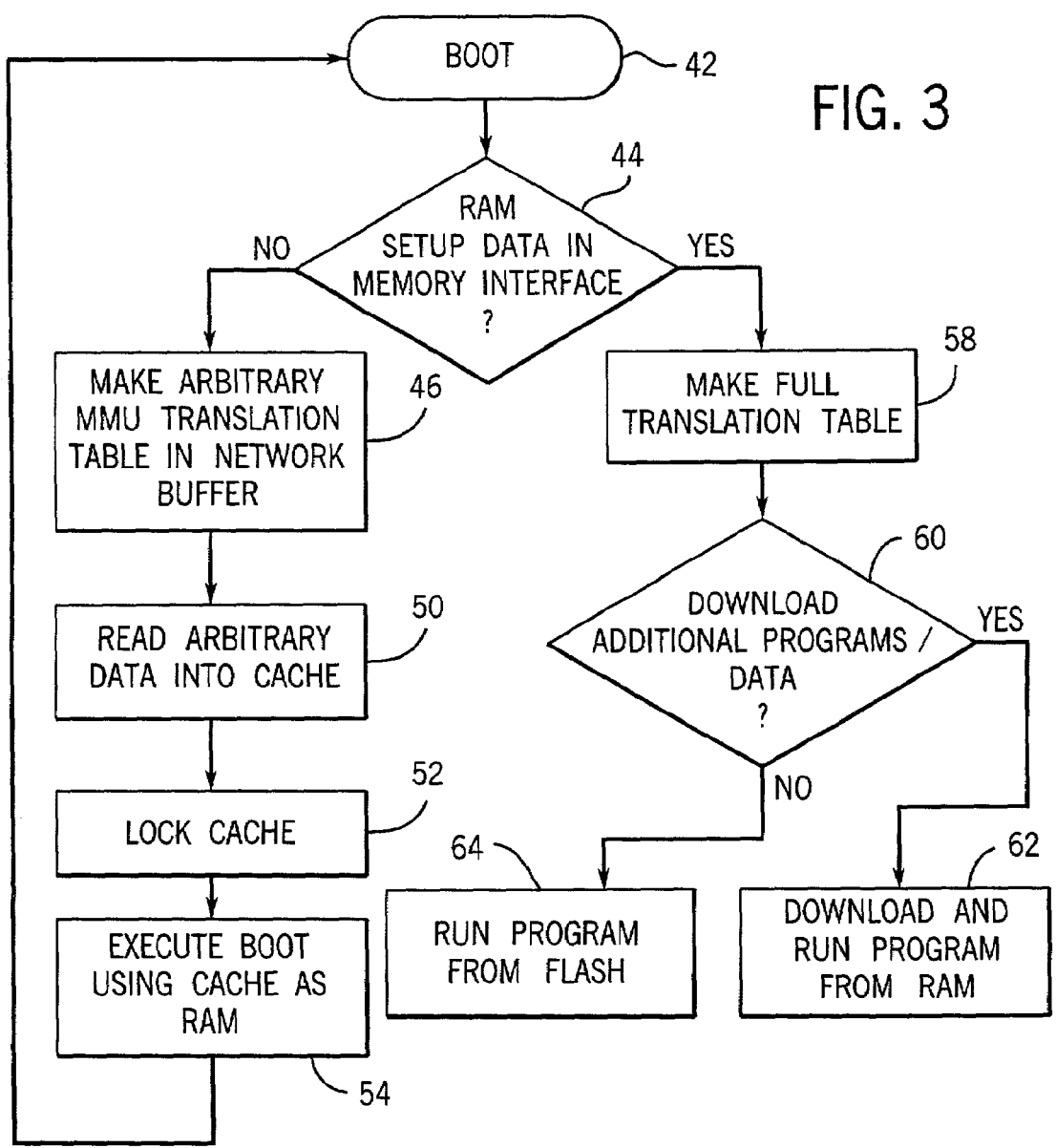

PROCESSOR WITH VERSATILE EXTERNAL MEMORY INTERFACE

CROSS-REFERENCE TO RELATED APPLICATIONS

--

STATEMENT REGARDING FEDERALLY SPONSORED RESEARCH OR DEVELOPMENT

--

BACKGROUND OF THE INVENTION

The present invention relates to computer architectures adapted for embedded processing and, in particular, to an embedded processor that may work with a variety of different memory types.

Embedded processors are typically intended to provide control of a specific hardware device into which it is embedded, for example, a household appliance or industrial device. The program executed by the embedded processor is normally stored in a non-volatile memory, for example, flash memory or downloaded from an external source.

For reasons of cost efficiency, embedded processors normally include the processing unit on the same integrated circuit as other system circuits such as input and output circuits used to communicate the device being controlled and a network interface when the embedded application includes a network connection.

An exception to this single "chip" integration is the memory system, such as random access memory (RAM) which, for reasons of flexibility, cost, and size may be implemented in one or more separate integrated circuits. Separating the RAM from the embedded processor allows greater flexibility in varying the amount of memory necessary for different embedded applications, allows for more efficient fabrication of the memory, and allows the designer to take advantage of rapidly changing advances in memory technology and design.

The embedded processor may also incorporate into the integrated circuit a small "boot" memory, typically a read-only-memory holding a "bootstrap program". The term bootstrap refers to the phrase "pulling oneself up by one's bootstraps", that is, raising oneself through one's own, unaided effort. Analogously, the bootstrap program provides the embedded processor with a compact program sufficient so that the embedded processor may load a much more complex program (typically the control program) without external support. The bootstrap program is usually invoked after resetting or at powering-up of the device.

During the booting process, general memory is required for the temporary storage of register values and other variables. For this reason, the bootstrap program must normally be programmed with sufficient information about the external memory to be able to successfully communicate with this memory. This preprogramming of the boot ROM with the particular external memory setup data limits the use of the embedded processor to that particular memory type.

What is needed is an embedded processor that may be used flexibly with a wide variety of different external memory types.

SUMMARY OF THE INVENTION

The present invention provides an embedded processor that may be configured to work with a wide variety of external memory types according to memory setup data read from an external source during the booting process. Prior to having the necessary memory setup data, and thus being able to use the external memory, the bootstrapping program exploits incidental system storage structures such as cache and network buffers to temporarily fill the role of external memory until the external memory has been properly identified and an interface developed.

Thus, specifically, the present invention provides an integrated processor system comprising an interconnected processing unit performing arithmetic and logical operations, interface circuits for communicating with external devices, and a memory interface for communicating with external memory. A non-volatile boot memory is provided holding a bootstrap program and at least one internal storage structure selected from the group consisting of cache buffers and registers. The processor executes the bootstrap program contained in the non-volatile boot memory using at least one internal storage structure for temporary storage without the use of external memory.

Thus, it is one object of the invention to provide a processor system using external memory that may execute its bootstrap program before connection with the external memory. In this way, the boot process may identify and configure the memory interfaces for arbitrary external memory types.

The bootstrap program may provide for the acquisition of external memory setup data required for the communication with external memory.

It is thus another object of the invention to allow the bootstrap program to use external sources for the memory setup data and thus to allow it to be used with arbitrary memory types simply by changing data in an external source.

The interface circuits may include a network interface and the bootstrap program may provide for the acquisition of the external memory setup data through a network connection. Alternatively, the external memory may include non-volatile memory and the bootstrap program may provide for the acquisition of the external memory setup data from the external non-volatile memory.

Thus, it is another object of the invention to provide for a variety of ways of identifying the external memory to the processor system.

The internal storage structure may be a cache memory and the bootstrap program may execute to read arbitrary data into the cache memory and to lock the cache memory against external reading or writing so that it may be used as variable storage by the processor for further execution of the bootstrap program.

Thus, it is another object of the invention to use the commonly available cache structure in place of the external memory during the boot process. Prior to connection with the external memory, the cache structure is not required, and can serve in this alternative capacity.

The processor may require an address translation table mapping internal addresses to physical addresses and, the bootstrap program may make a temporary address translation table in a buffer memory and use the cache memory for temporary storage.

Thus it is another object of the invention to provide for the generation of a translation table, that may be necessary before use of the cache, through the use of another system storage structure found in buffers often associated, for example, with network interfaces and the like.

The bootstrap program may further execute after obtaining memory setup data to load additional programs for execution into the random access memory.

Thus, it is another object of the invention to provide for a normal booting of operational programs into external memory.

The setup data may be selected from the group consisting of memory type as static or dynamic, memory speed, memory size, memory parity, and memory timing.

Thus, it is another object of the invention to provide maximum flexibility in linking the processor of the present invention with different types of external memory.

The foregoing objects and advantages may not apply to all embodiments of the invention and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

BRIEF DESCRIPTION OF THE DRAWINGS

FIG. 3 is a flow chart showing the steps executed by the processing unit of FIG. 2 in executing the bootstrap program of the boot memory during the boot process;

FIG. 4 is a diagram of a translation table used by the processing unit in mapping internal memory addresses to memory addresses of an external memory system.

DETAILED DESCRIPTION OF THE PREFERRED EMBODIMENT

Figure 1:
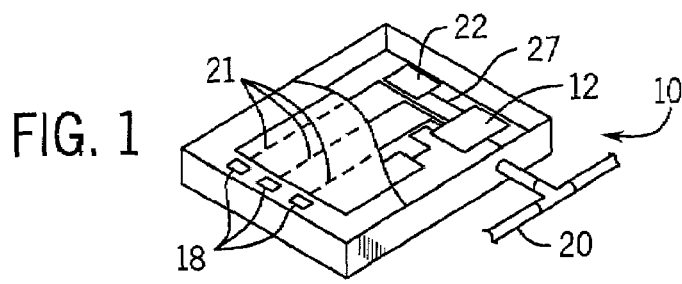
FIG. 1 is a perspective view in phantom of a display panel for use with an industrial control system such as may include an embedded processor of the present invention and external memory.

Referring now to FIG. 1, an example device 10 incorporating an embedded processor 12 may be a human machine interface (HMI) for an industrial control system or the like. The HMI provides a display panel 15 such as a plasma or liquid crystal display (LCD) presenting information to a user, and a plurality of buttons 18 through which input information may be entered by the user. The buttons 18 and a drive circuit for the display panel 15 may communicate directly with the embedded processor 12 through dedicated input/output lines 21. The embedded processor 12 may also communicate directly with a network 20 and may include a connection 27 to external memory 22.

Figure 2:
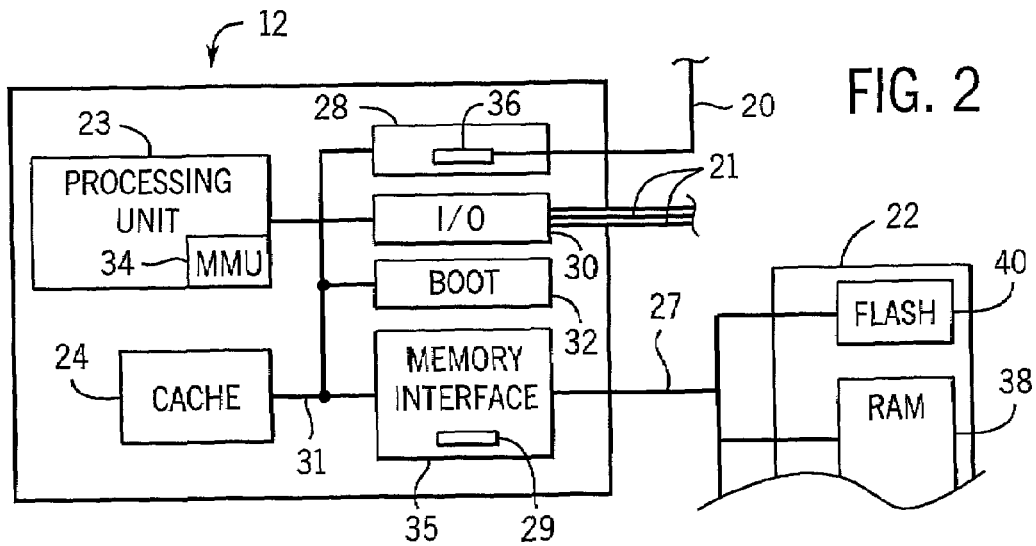
FIG. 2 is a schematic block diagram of the embedded processor and external memory of FIG. 1 showing the integrated processing unit, cache, network interface, boot memory, and memory interface of the processor.

Referring now to FIG. 2, in the present example, the embedded processor 12 may include a processing unit 23, including a memory management unit (MMU) 34. The processing unit 23 provides a standard computer architecture allowing for the execution of arithmetic and logical instructions. The MMU 34 provides a mapping of processor internal addresses to addresses of the external memory 22.

The processing unit 23 connects over an internal bus 31 with a cache 24, network interface circuit 28, input and output (I/O) circuits 30, boot memory 32 and, a memory interface circuit 35. In the preferred embodiment, all of these structures are on a single integrated circuit, however, multiple standardized integrated circuits may also be used and other, additional or fewer structures may also be incorporated into the processing unit 12.

The cache 24 provides rapid access by the processing unit 23 to the external memory 22 by prefetching address blocks of the external memory 23 using cache protocols well known in the art. Under the guidance of cache control circuitry (not separately shown), a block of data is loaded into the cache where it is read and written to directly by the processing unit 23 to reduce delays inherent in direct communication with the external memory.

The network interface circuits 28 may include dedicated buffer memory 36 so as to implement a standard network protocol such as EtherNet, ControlNet, DeviceNet, or the like. The I/O circuits 30 may include various I/O registers and necessary buffer and level shifting circuits to provide a communication with the I/O lines 21. I/O circuits 30 may accommodate parallel binary I/O signals or serial signals and analog signals using analog to digital and digital to analog conversion circuitry well known in the art. The boot memory 32 may be a standard read-only memory (ROM) incorporating a bootstrap program as will be described.

The memory interface circuit 35 provides dynamic and/or static memory control circuits for these different types of external memory. The memory interface circuits 35 include registers (not shown) for holding external memory setup data including, but not limited to, memory type as static or dynamic, memory speed, memory size, memory parity, memory timing. Memory timing may include for example, low level timing specifications for the external memory including, but not limited to, row access strobe (RAS) and column access strobe (CAS) latency. Generally, the memory setup data provides the necessary parameter values for the memory interface 35 necessary to connect to the external memory 22. The memory interface 35 also includes a flag readable by the processor 23 indicating when it has been loaded with external memory setup data 29. This flag need not be in the memory interface as long as it is persistent through a reset.

Each of these structures is well known in the art and commercially available as standard cells for integrated circuit design.

The processor unit 23 may connect via the memory interface 35 to the external memory 22 which may include standard random access memory (RAM) 38 and flash memory 40, the former being volatile but the latter being non-volatile and thus suitable for long term storing of additional programs or information. Generally, the flash memory must be of a standard type whose parameters and addresses are contained in the boot memory 30, however, the RAM may be of a wide variety of different memory types and of different sizes. The invention is equally applicable to other memory arrangements as will be appreciated from the following discussion.

Referring now to FIG. 3, upon boot-up, indicated by process block 42, the embedded processor 12 is directed to a location in the boot memory 32 at the beginning of the bootstrap program. This program then implements a decision block 44 where the processing unit 23 determines whether external memory setup data 29 is present in the memory interface 35 by testing the flag described above.

Assuming that the external memory setup data 29 has not yet been loaded into the memory interface 35, as will normally be the case upon initial power-up, the program branches to process block 46 where the MMU 34 is initialized by presenting it with a predetermined translation table necessary before use of the cache 24.

Referring still to FIG. 3, the translation table provides a logical table having columns linked by rows and holding, respectively: an internal address block being part of the address space of the processing unit 23, a flag indicating whether the particular memory block is cacheable with cache 24, and an external address block corresponding in size to the internal address block but mapped to the address space of the external memory 22.

Following the premise that the embedded processor 12 will work with any kind of external memory 22 or a wide variety of external memory 22, the translation table 48 cannot at this time be accurately completed except for the fixed addresses of the flash memory 40, and thus the predetermined translation table 48 is, in fact, composed in the third column of arbitrarily selected values that may or may not correspond to actual physical memory addresses of the external memory 22 with the exception of at least one row dealing with the flash memory 40. As will be seen, this is of no consequence because external memory will not be used, but the table is prepared only as a prelude to using the cache 24.

At process block 50, the bootstrap program reads into the cache 24 values from the external memory 22 of desired internal address values, each of which is flagged as cacheable. As the translation table 48 was developed in ignorance of the make-up of the external memory 22, it is likely that these values read into the cache 24 do not have meaningful values. They are loaded into the cache 24 so that, without violating normal cache protocols, subsequent writing and reading of the cache may now occur.

At process block 52, the cache is locked again following normal cache protocols, preventing a writeback of the cache 24 to the external memory 22. With the locking of the cache 24 at block 52, the bootstrap program may continue execution as indicated by process block 54 to acquire the external memory setup data 29.

Figure 5:
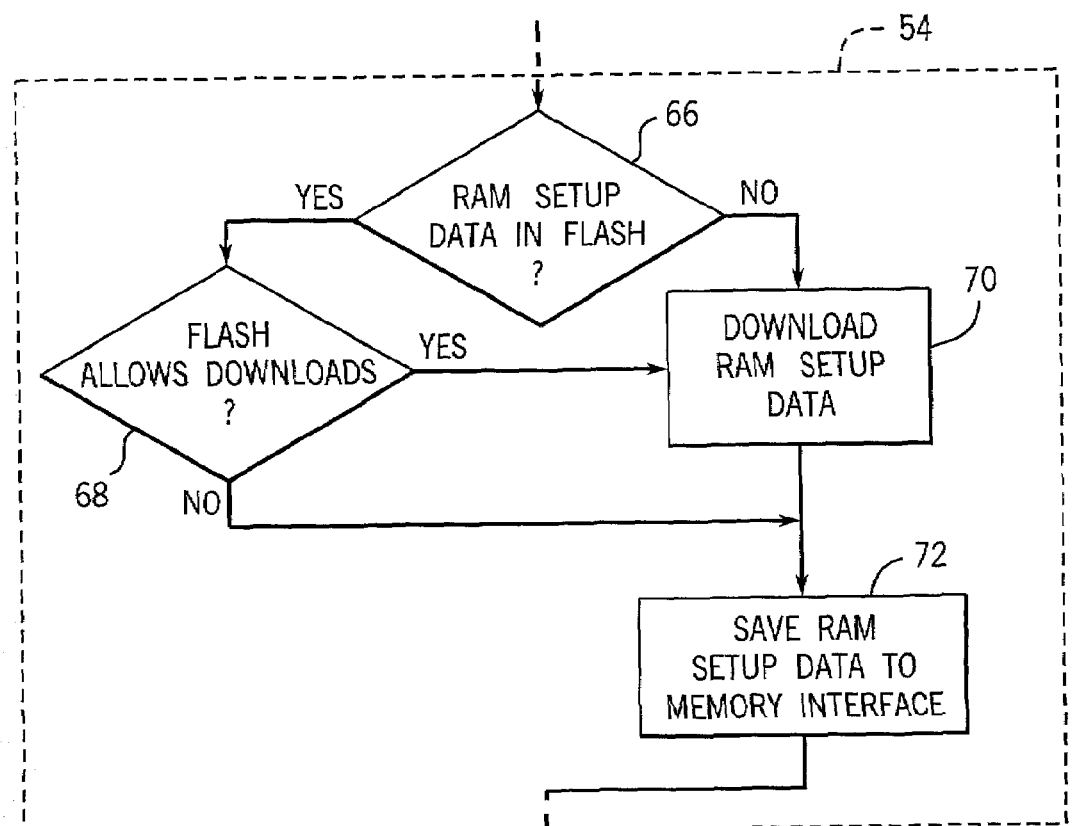
FIG. 5 is a detailed flow chart of the execution of the bootstrap program of FIG. 3 in obtaining external memory setup data.

The external memory setup data 29 may come from a variety of sources. Referring now to FIG. 5, at the beginning of process block 54, the bootstrap program determines whether the external memory setup data 29 is contained in flash memory 40 or not as indicated by decision block 66. This may be determined by investigating the known address of flash memory 22 in external memory 22 to see both whether there is any flash memory 40 and if there is flash memory 40, whether the flash memory 40 contains valid external memory setup data 29. As mentioned, the flash memory 40 is of a standard type whose memory setup data is preloaded into the boot memory 30. If flash memory 40 exists, then the program proceeds to decision block 68 where the flash memory 40 is reviewed to determine whether downloading of additional or alternative external memory setup data 29 is allowed. If such downloading is allowed, the program branches to the downloading block 70. If such downloading is not allowed, the program branches to the process block 72 described below.

Returning to decision block 66, if no flash memory 40 exists, or if the flash memory 40 does not have valid external memory setup data 29, the program proceeds to the downloading block 70 at which the network 20 is interrogated at a predetermined address for external memory setup data 29.

Assuming that the external memory setup data 29 is obtained either by downloading or from the flash memory 40 (or both) the program proceeds to process block 72 where the external memory setup data 29 is saved in the memory interface 35 and the flag set indicating that valid external memory setup data 29 is contained therein.

Returning now to FIG. 3, once the external memory setup data 29 is obtained, then at process block 56, the processor is rebooted by jumping to the appropriate location in the boot memory 30 to return to decision block 44. At this point, the memory interface 35 will have been initialized with valid external memory setup data 29 and so, the program branches to process block 58 uses of the external memory setup data 29 to build a full translation table 498 for the MMU in RAM 38.

At succeeding process block 60, the program determines whether additional programs (e.g. a full operating system or other control programs) to be executed by the processor unit 23 are to be obtained by downloading. If downloading is indicated, the program proceeds to process block 62 to download the necessary programming from the appropriate address. If not, the program proceeds to process block 64 and the program in flash memory 40 as identified by the RAM setup data is executed.

As will be understood from the foregoing description, the invention employs system storage structures such as buffers, registers, and cache, providing memory like features yet not used during normal operation of the processing unit for general purpose storage, in lieu of standard memory providing general purpose storage during the boot process, thus freeing the designer to use a wide variety of different memory types and sizes in constructing embedded applications.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. An integrated processor system comprising:
    a common integrated circuit substrate without general-purpose random access memory and holding each of:
    (1) a processing unit for performing arithmetic and logical operations;
    (2) at least one internal system storage structure selected from the group consisting of caches, buffers, and registers;
    (3) an external memory interface for connecting to an external random access memory not on the common substrate;
    a bootstrap program executable by the processing unit, wherein the processing unit
    (i) executes at least a portion of a bootstrap program to determine memory set-up data needed to communicate with external random access memory while using the at least one internal system storage structure for temporary storage required for execution of the bootstrap program without write access to external memory for storage of data necessary for the execution of the bootstrap program;
    (ii) only after the execution of (i) connects to the external memory as will ultimately use the selected set up data, for the reading and writing to the external memory.

2. The integrated processor system of claim 1 further including: interface circuits for communicating electrical signals with non-memory external devices.

3. The integrated processor system of claim 1 further including: a memory interface for communicating with external memory; and wherein the processing unit executes at least a portion of the bootstrap program to provide for the acquisition of external memory setup data required for the memory interface to initiate communication with external memory.

4. The integrated processor system of claim 3 further including: a network interface and wherein the processing unit executes at least a portion of the bootstrap program to provide for the acquisition of the external memory setup data through a network connection.

5. The integrated processor system of claim 3 wherein the processing unit further communicates with external non-volatile memory and wherein the processing unit executes at least a portion of the bootstrap program to provide for the acquisition of the external memory setup data from the external non-volatile memory.

6. The integrated processor system of claim 1 comprising wherein the external non-volatile memory is flash memory.

7. An integrated processor system comprising:
a common integrated circuit substrate without general-purpose random access memory and holding each of:
(1) a processing unit for performing arithmetic and logical operations;
(2) at least one internal system storage structure selected from the group consisting of caches, buffers, and registers;
(3) an external memory interface for connecting to an external random access memory not on the common substrate;
a bootstrap program executable by the processing unit, wherein the processing unit
(i) executes at least a portion of a bootstrap program to determine memory set-up data needed to communicate with external random access memory while using the at least one internal system storage structure for temporary storage required for execution of the bootstrap program without write access to external memory for storage of data necessary for the execution of the bootstrap program;
(ii) only after the execution of (i) connects to the external memory as will ultimately use the selected set up data, for the reading and writing to the external memory;
further including: a memory interface for communicating with external memory; and wherein the processing unit executes at least a portion of the bootstrap program to provide for the acquisition of external memory setup data required for the memory interface to initiate communication with external memory;
wherein the processing unit includes an address translation table mapping processing unit addresses to addresses of the external memory and wherein the processing unit executes at least a portion of the bootstrap program to make a temporary address translation table in a buffer memory so as to make the internal system storage structure available for temporary storage.

8. The integrated processor system of claim 1 wherein the system storage structure is a cache memory and wherein the processing unit executes at least a portion of the bootstrap program to read arbitrary data into the cache memory and then to lock the cache memory against further reading or writing to external memory so that it may be used as variable storage for further execution of the bootstrap program.

9. The integrated processor system of claim 3 wherein the processing unit further executes at least a portion of the bootstrap program to store the memory setup data in the memory interface and further load additional programs for execution into external memory.

10. The integrated processor system of claim 3 wherein the processing unit further executes at least a portion of the bootstrap program to store the memory setup data in the memory interface and then to execute a program contained in external memory.

11. The integrated processor system of claim 3 wherein the memory setup data is selected from the group consisting of: memory type as static or dynamic, memory speed, memory size, memory parity, and memory timing.

12. A method of initializing an integrated processor system not including a common integrated circuit substrate general purpose random access memory but including, on the common integrated circuit substrate, a processing unit for performing arithmetic and logical operations; at least one internal system storage structure selected from the group consisting of: caches, buffers, and registers; and an external memory interface for connecting to an external general purpose random access memory not on the common substrate comprising the step of:
executing at least a portion of a bootstrap program by the processing unit to determine memory set-up data needed to communicate with different types of external memory while using the at least one internal system storage structure for temporary storage needed for the execution of the bootstrap program without access to external memory for storage of data needed for the execution of the bootstrap program;
only after determination of the memory set-up data, connecting to the external memory as will use the selected set up data for the reading and writing to the external memory.

13. The method of initializing an integrated processor system of claim 12 wherein the processor system further includes interface circuits for communicating electrical signals with non-memory external devices.

14. The method of initializing an integrated processor system of claim 12 wherein the processor system further includes a memory interface for communicating with external memory; and
including the step of executing at least a portion of the bootstrap program by the processing unit to provide for the acquisition of external memory setup data required for the memory interface to initiate communication with external memory.

15. The method of initializing an integrated processor system of claim 14 wherein the processing unit further includes a network interface and including the step of executing at least a portion of the bootstrap program by the processing unit to provide for the acquisition of the external memory setup data through a network connection.

16. The method of initializing an integrated processor system of claim 14 wherein the processing unit further communicates with external non-volatile memory and including the step of executing at least a portion of the bootstrap program by the processing unit to provide for the acquisition of the external memory setup data from the external non-volatile memory.

17. A method of initializing an integrated processor system not including a common integrated circuit substrate general purpose random access memory but including, on the common integrated circuit substrate, a processing unit for performing arithmetic and logical operations; at least one internal system storage structure selected from the group consisting of: caches, buffers, and registers; and an external memory interface for connecting to an external general purpose random access memory not on the common substrate comprising the step of:

executing at least a portion of a bootstrap program by the processing unit to determine memory set-up data needed to communicate with different types of external memory while using the at least one internal system storage structure for temporary storage needed for the execution of the bootstrap program without access to external memory for storage of data needed for the execution of the bootstrap program;

only after determination of the memory set-up data, connecting to the external memory as will use the selected set up data for the reading and writing to the external memory;

wherein the processor system further includes a memory interface for communicating with external memory;

wherein the processing unit includes an address translation table mapping processing unit addresses to addresses of the external memory and including the step of executing at least a portion of the bootstrap program to make a temporary address translation table in a buffer memory so as to make the internal system storage structure available for temporary storage.

18. The method of initializing an integrated processor system of claim 12 wherein the system storage structure is a cache memory and including the step of executing at least a portion of the bootstrap program by the processing unit to read arbitrary data into the cache memory and then to lock the cache memory against further reading or writing to external memory so that it may be used as variable storage for further execution of the bootstrap program.

19. The method of initializing an integrated processor system of claim 14 including the step of executing at least a portion of the bootstrap program by the processing unit to store the memory setup data in the memory interface and further load additional programs for execution into external memory.

20. The method of initializing an integrated processor system of claim 14 including the step of executing at least a portion of the bootstrap program by the processing unit to store the memory setup data in the memory interface and then to execute a program contained in external memory.

21. The method of initializing an integrated processor system of claim 14 wherein the memory setup data is selected from the group consisting of: memory type as static or dynamic, memory speed, memory size, memory parity, and memory timing.

22. The method of initializing an integrated processor system of claim 12 wherein the bootstrap program is stored in a bootstrap memory also on the common integrated circuit substrate.

23. The integrated processor system of claim 1 wherein the bootstrap program is stored in a bootstrap memory also on the common integrated circuit substrate.

\* \* \* \* \*